United States Patent
Ohashi et al.

(10) Patent No.: US 9,539,911 B2
(45) Date of Patent: Jan. 10, 2017

(54) VEHICLE GUIDANCE DEVICE AND VEHICLE GUIDANCE METHOD

(71) Applicant: Panasonic Corporation, Osaka (JP)

(72) Inventors: Osamu Ohashi, Kanagawa (JP); Tsuyoshi Nishio, Kanagawa (JP); Noriaki Asaoka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/363,136

(22) PCT Filed: Dec. 6, 2012

(86) PCT No.: PCT/JP2012/007816
§ 371 (c)(1),
(2) Date: Jun. 5, 2014

(87) PCT Pub. No.: WO2013/084492
PCT Pub. Date: Jun. 13, 2013

(65) Prior Publication Data
US 2014/0371966 A1 Dec. 18, 2014

(30) Foreign Application Priority Data

Dec. 6, 2011 (JP) ................. 2011-266924

(51) Int. Cl.
*B60L 11/18* (2006.01)
*H02J 5/00* (2016.01)
(Continued)

(52) U.S. Cl.
CPC .......... *B60L 11/182* (2013.01); *B60L 11/1829* (2013.01); *B60L 11/1831* (2013.01);
(Continued)

(58) Field of Classification Search
CPC ..... B60L 11/182; B60L 11/1831; H02J 5/005; H02J 7/0027
(Continued)

(56) References Cited

U.S. PATENT DOCUMENTS 8,922,066 B2 * 12/2014 Kesler ................. B60L 11/1812
307/104
8,933,594 B2 * 1/2015 Kurs ....................... B60L 3/003
307/104
(Continued)

FOREIGN PATENT DOCUMENTS

CN 101764435 A 6/2010
EP 2 783 900 A1 10/2014
(Continued)

OTHER PUBLICATIONS

International Search Report for Application No. PCT/JP2012/007816 dated Mar. 12, 2013.
(Continued)

*Primary Examiner* — Thomas G Black
*Assistant Examiner* — Wae Louie
(74) *Attorney, Agent, or Firm* — Pearne & Gordon LLP

(57) ABSTRACT

Disclosed is a vehicle guidance apparatus that can easily guide a vehicle in the vicinity of a power supply section to the power supply unit by guiding the vehicle along a path of travel to the power supply unit without employing image data. In this device, a power supply efficiency calculation unit calculates the power supply efficiency, which is the efficiency with which power is received from the power supply unit by the charging unit. An amount of change calculation unit calculates the amount of change of efficiency of power supply, which is the amount of change of efficiency of power supply calculated by the power supply efficiency calculation unit. A vehicle-side control unit dis-
(Continued)

plays on a display guidance to enable the vehicle to reach the power supply unit, based on the amount of change of efficiency of power supply calculated by the amount of change calculation unit.

5 Claims, 9 Drawing Sheets

(51) Int. Cl.
*H02J 7/00* (2006.01)
*H02J 7/02* (2016.01)
*B60W 30/10* (2006.01)

(52) U.S. Cl.
CPC ........... *B60L 11/1833* (2013.01); *H02J 5/005* (2013.01); *H02J 7/0027* (2013.01); *H02J 7/025* (2013.01); *B60L 2240/12* (2013.01); *B60L 2250/10* (2013.01); *B60L 2250/16* (2013.01); *B60W 30/10* (2013.01); *B60W 2510/244* (2013.01); *Y02T 10/7005* (2013.01); *Y02T 10/7055* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
USPC ............ 701/22, 408; 307/326, 104, 149, 9.1
See application file for complete search history.

(56) References Cited

U.S. PATENT DOCUMENTS

| | | | |
|---|---|---|---|
| 2010/0161216 A1* | 6/2010 | Yamamoto | B60L 11/182 701/408 |
| 2010/0201513 A1 | 8/2010 | Vorenkamp et al. | |
| 2012/0200151 A1* | 8/2012 | Obayashi | B60L 11/123 307/9.1 |
| 2013/0030615 A1* | 1/2013 | Ichikawa | B60L 11/182 701/22 |
| 2014/0322570 A1* | 10/2014 | Nakamura | B60K 1/00 429/72 |
| 2014/0333128 A1* | 11/2014 | Ichikawa | H02J 7/025 307/9.1 |
| 2014/0354041 A1* | 12/2014 | Yoshi | H02J 7/025 307/9.1 |
| 2014/0371966 A1* | 12/2014 | Ohashi | B60L 11/1831 701/22 |
| 2015/0035482 A1* | 2/2015 | Kume | B60L 11/182 320/108 |
| 2015/0142238 A1* | 5/2015 | Sako | B60L 7/12 701/22 |

FOREIGN PATENT DOCUMENTS

| | | |
|---|---|---|
| JP | 2006-345588 A | 12/2006 |
| JP | 2010-172184 A | 8/2010 |
| JP | 2010-183813 A | 8/2010 |
| JP | 2010-234878 A | 10/2010 |
| JP | 2010-246348 A | 10/2010 |
| JP | 2011-160515 A | 8/2011 |
| JP | 2011-205829 A | 10/2011 |
| WO | 2011/110924 A1 | 9/2011 |
| WO | 2011/132272 A1 | 10/2011 |

OTHER PUBLICATIONS

Supplementary European Search Report for Application No. 12855126.4 dated Sep. 10, 2015.

European Office Action for Application No. EP12 855 126.4 dated Sep. 19, 2016.

* cited by examiner

UNIT: [%]/[m]

| APPROACH ROUTE \ POWER SUPPLY EFFICIENCY [%] | GREATER THAN 70 | 70 | 60 | 50 | 40 | 30 | 20 | 10 |
|---|---|---|---|---|---|---|---|---|
| 1 | OK | 4.5 | 8 | 10 | 11 | 8 | 6 | 2.5 |
| 2 | N/A | N/A | 2 | 5 | 7 | 6.5 | 3.5 | 2 |
| 3 | 0 | 0 | 4 | 6 | 8 | 7 | 3.5 | 2 |
| 4 | −3.5 | −3.5 | 5 | 8 | 8.5 | 8 | 7 | 2 |

FIG. 9

VEHICLE GUIDANCE DEVICE AND VEHICLE GUIDANCE METHOD

TECHNICAL FIELD

The present invention relates to a vehicle guidance apparatus that is mounted on a vehicle which receives power from a power supply section in a non-contact state and that guides the vehicle to the power supply section, and also to a vehicle guidance method.

BACKGROUND ART

In a vehicle that runs using electricity stored in a storage battery of an electric vehicle or the like as a power source, the storage battery needs to be charged by using a power supply apparatus when the vehicle stops in a parking lot or the like. As a non-contact power supply apparatus of the related art, there is known a power supply apparatus in which a power supply section installed on the ground surface supplies power to a power receiving section mounted on the vehicle. The power supply section is installed on a road surface at a position where the vehicle stops such as a parking space or the like. Meanwhile, the power receiving section is installed on the bottom surface of the vehicle at a position facing the power supply section installed on the ground surface.

In the non-contact charging system, when it is impossible to accurately match the positions of the power receiving section and the power supply section, a gap occurs in distance between the power receiving section and the power supply section. As a result, the charging efficiency is reduced or the leakage magnetic field or the unnecessary radiation occurs. Conventionally, as a method for improving the accuracy of position matching between the power receiving section and the power supply section, there is known a vehicle guidance apparatus that guides an accurate positional relation between the vehicle and the power supply apparatus by using images around the vehicle (for example, PTL 1).

In PTL 1, the image data obtained by capturing images around a vehicle by a camera is combined so as to generate a combined image of an area including the vehicle, and the positional relation between the power supply section and the power receiving section is specified based on the measured power receiving efficiency. In PTL 1, when the combined image thus generated includes an image of the power supply section, the position of the power receiving section is displayed based on the specific positional relation between the positions of the power supply section and the power receiving section in the combined image.

CITATION LIST

Patent Literature

PTL 1
Japanese Patent Application Laid-Open No. 2010-234878

SUMMARY OF INVENTION

Technical Problem

However, in PTL 1, the power supply section in the image data needs to be identified, so that, a problem arises in that the power supply section in the image data cannot be identified when the power supply section is captured at a place distant from the power supply section. Further, in PTL 1, a problem also arises in that the power supply section in the image data cannot be identified even when the power supply section is captured at a place where the light is not sufficient at night.

An object of the invention is to provide a vehicle guidance apparatus and a vehicle guidance method capable of easily guiding a vehicle approaching a power supply section to the power supply section even when the power supply section is captured at a position distant from the power supply section or the periphery of the vehicle is dark, by guiding an approach route with respect to the power supply section without using image data.

Solution to Problem

A vehicle guidance apparatus according to an aspect of the present invention is an apparatus configured to be mounted on a vehicle that receives power from a power supply section in a non-contact state and to guide the vehicle to the power supply section, the vehicle guidance apparatus including: a power receiving section that receives power from the power supply section; a power supply efficiency calculation section that calculates a power supply efficiency that indicates how efficiently the power receiving section receives the power from the power supply section; a change amount calculation section that calculates a power supply efficiency change amount that is a change amount of the power supply efficiency calculated by the power supply efficiency calculation section; and a control section that causes an indication section to make indication for guiding the vehicle to the power supply section based on the power supply efficiency change amount calculated by the change amount calculation section.

A vehicle guidance method according to an aspect of the present invention is a method for a vehicle guidance apparatus configured to be mounted on a vehicle that receives power from a power supply section in a non-contact state and to guide the vehicle to the power supply section, the vehicle guidance method including: calculating a power supply efficiency that indicates how efficiently a power receiving section configured to receive power from the power supply section receives the power from the power supply section; calculating a power supply efficiency change amount that is a change amount of the power supply efficiency calculated in the calculating of the power supply efficiency; and controlling indication for guiding the vehicle to the power supply section based on the power supply efficiency change amount calculated in the calculating of the power supply efficiency change amount.

Advantageous Effects of Invention

According to the present invention, guiding a vehicle using an approach route with respect to a power supply section without using image data makes it possible to easily guide the vehicle to the power supply section even when the vehicle approaches the power supply section from a place distant from the power supply section, or even when the periphery of the vehicle is dark.

BRIEF DESCRIPTION OF DRAWINGS

FIG. 9 is a diagram illustrating a power supply efficiency change amount per unit moving distance for the power supply efficiency at each approach route acquired from FIG. 8.

DESCRIPTION OF EMBODIMENTS

Hereinafter, an embodiment of the invention will be described in detail with reference to the drawings.

Embodiment

Figure 1:
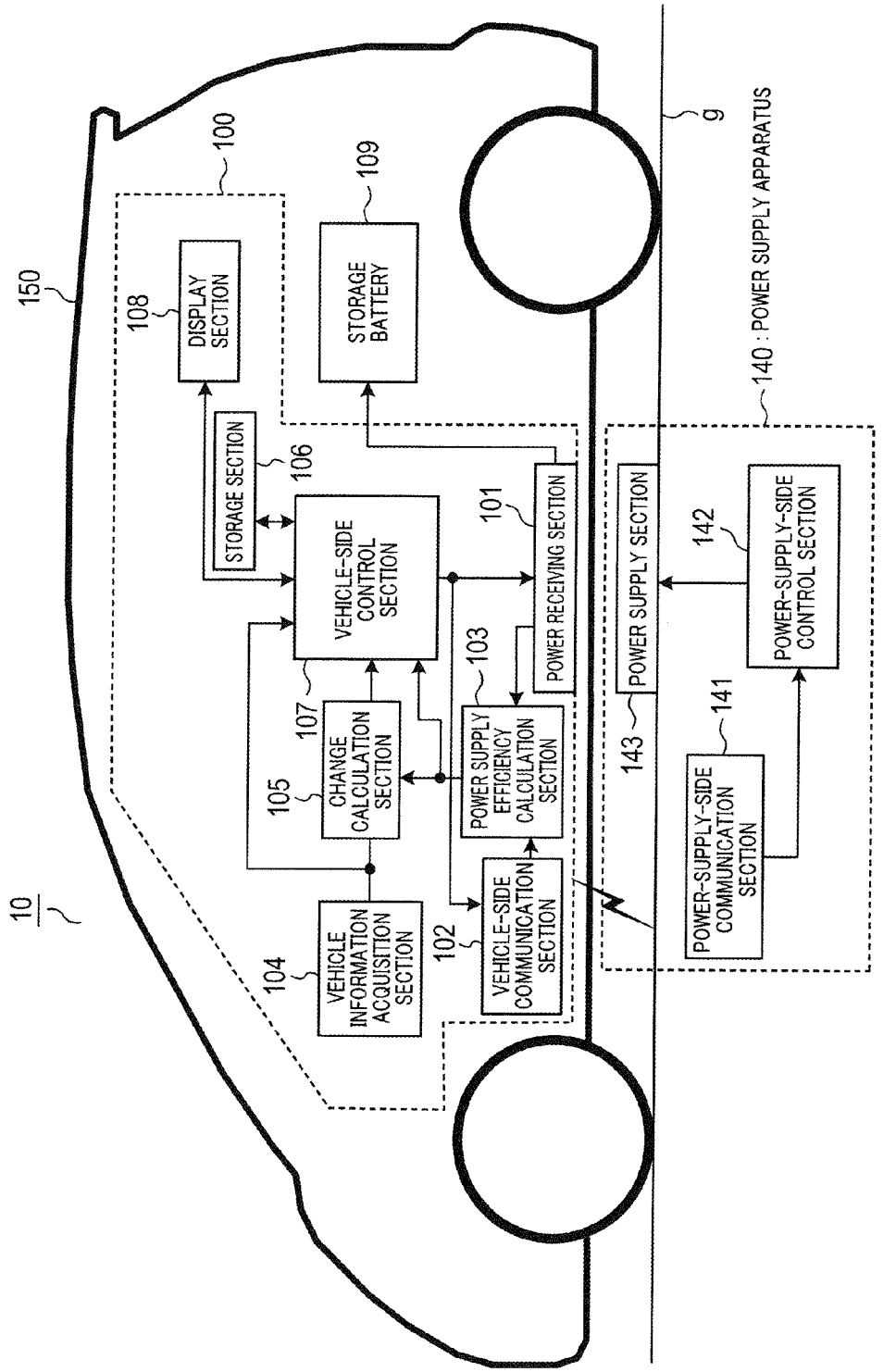
FIG. 1 is a block diagram illustrating a configuration of a charging system of an embodiment of the present invention.

FIG. 1 is a block diagram illustrating a configuration of charging system 10 of the embodiment of the invention.

Charging system 10 includes power supply apparatus 140 and vehicle 150.

Power supply apparatus 140 is installed on the ground or buried in the ground so that power supply section 143 is exposed from ground surface g. Power supply apparatus 140 is installed in, for example, a parking space, and supplies power to power receiving section 101 while facing power receiving section 101 of parked vehicle 150.

Vehicle 150 includes vehicle guidance apparatus 100 and storage battery 109, and runs using the power accumulated in storage battery 109 as a power source. Vehicle 150 is, for example, an electric vehicle.

Storage battery 109 accumulates the power supplied from power supply section 143 to power receiving section 101.

Vehicle guidance apparatus 100 guides vehicle 150 when vehicle 150 approaches power supply apparatus 140.

Furthermore, FIG. 1 illustrates a positional relation between vehicle 150 and power supply apparatus 140 in a charging state, and vehicle guidance apparatus 100 guides vehicle 150 until the positional relation illustrated in FIG. 1 is established.

<Configuration of Vehicle Guidance Apparatus>

Vehicle guidance apparatus 100 includes power receiving section 101, vehicle-side communication section 102, power supply efficiency calculation section 103, vehicle information acquisition section 104, change amount calculation section 105, storage section 106, vehicle-side control section 107, and display section 108.

Power receiving section 101 is installed at the bottom portion of vehicle 150, and faces power supply section 143 in a charging state. Power receiving section 101 receives power from power supply section 143 in a non-contact state in accordance with the control of vehicle-side control section 107. Power receiving section 101 and power supply section 143 each include a built-in coil. Power supply section 143 supplies power to power receiving section 101 by electromagnetic induction (for example, an electromagnetic induction method, a magnetic resonance method, and the like). Furthermore, power receiving section 101 may receive power in accordance with the distance with respect to power supply section 143 even in a case where the power receiving section does not completely face power supply section 143. That is, the power supplied from power supply section 143 to power receiving section 101 becomes greater as the power receiving section becomes closer to power supply section 143 (i.e., as the area of the portion facing power supply section 143 becomes greater).

Vehicle-side communication section 102 generates a charge start signal or a charge stop signal in accordance with the control of vehicle-side control section 107, and transmits the generated charge start signal or the generated charge stop signal to power-supply-side communication section 141. Vehicle-side communication section 102 receives a reference value (a second reference value), which is transmitted from power supply section 143 to power receiving section 101, from power-supply-side communication section 141 and outputs the received reference value to power supply efficiency calculation section 103. Here, the reference value indicates the lower-limit value of the power to be transmitted to power receiving section 101 in a charging state and is set to, for example, a power value that makes the power supply efficiency equal to 70%.

Power supply efficiency calculation section 103 calculates the efficiency of the power transmitted from power supply section 143 to power receiving section 101. Specifically, power supply efficiency calculation section 103 acquires the actual measurement value of the power currently received by power receiving section 101. Power supply efficiency calculation section 103 calculates the power supply efficiency as the ratio between the reference value and the actual measurement value of the power currently received by power receiving section 101. Power supply efficiency calculation section 103 sequentially outputs the calculated power supply efficiency to change amount calculation section 105 and vehicle-side control section 107.

Vehicle information acquisition section 104 acquires vehicle information from a device of vehicle 150, extracts vehicle speed information representing the speed of vehicle 150 in the vehicle information, and outputs the vehicle speed information to change amount calculation section 105 and vehicle-side control section 107. Vehicle information acquisition section 104 acquires the vehicle speed information by, for example, a vehicle wheel speed sensor.

Change amount calculation section 105 acquires power supply efficiency change amount $\Delta k$ by using a plurality of power supply efficiencies. Then, when power supply efficiency change amount $\Delta k$ is equal to or less than 0, change amount calculation section 105 outputs power supply efficiency change amount $\Delta k$ to vehicle-side control section 107. Meanwhile, when power supply efficiency change amount $\Delta k$ is greater than 0, change amount calculation section 105 calculates the power supply efficiency by using the vehicle speed information and acquires the moving distance of vehicle 150 until the next power supply efficiency is calculated. Change amount calculation section 105 calculates power supply efficiency change amount Y per unit moving distance from the moving distance and the power supply efficiency change amount, and outputs the power supply efficiency change amount to vehicle-side control section 107.

Storage section 106 stores a lower-limit value of power supply efficiency change amount Y per unit distance of each of the power supply efficiencies in a table. Furthermore, the lower-limit value stored in the table is acquired in advance. The lower-limit value will be described later.

Vehicle-side control section 107 controls power receiving section 101 and vehicle-side communication section 102 when receiving a charge request from the outside.

Vehicle-side control section 107 determines that the approach route of vehicle 150 approaching power supply section 143 is wrong when power supply efficiency change amount Δk is equal to or less than 0. Further, vehicle-side control section 107 determines that the approach route of vehicle 150 approaching power supply section 143 is wrong when power supply efficiency change amount Y per unit moving distance input from change amount calculation section 105 is less than the lower-limit value of the power supply efficiency change amount of the table stored in storage section 106. Then, vehicle-side control section 107 displays guidance for correcting the approach route on display section 108 when it is determined that the approach route is wrong. Meanwhile, vehicle-side control section 107 determines that the approach route is correct when power supply efficiency change amount Δk is greater than 0 and power supply efficiency change amount Y per unit moving distance is equal to or greater than the lower-limit value. Then, vehicle-side control section 107 displays a message that the approach route is correct on display section 108 when it is determined that the approach route is correct. Furthermore, vehicle-side control section 107 may perform a control so that the message is displayed only when the approach route is wrong without displaying the message when the approach route is correct.

Vehicle-side control section 107 determines whether it is a brake stepping timing based on the power supply efficiency received from power supply efficiency calculation section 103 and power supply efficiency change amount Y per unit moving distance received from change amount calculation section 105. Specifically, when the power supply efficiency necessary for the charging operation is, for example, 70%, vehicle-side control section 107 acquires a subtraction value obtained by subtracting the current power supply efficiency from 70 and acquires the remaining distance to power supply section 143 by dividing the subtraction value by power supply efficiency change amount Y per unit moving distance. Then, vehicle-side control section 107 determines that it is the brake stepping timing when the remaining distance to power supply section 143 is less than a predetermined threshold value. When vehicle-side control section 107 determines that it is the brake stepping timing, the vehicle-side control section displays guidance for stopping vehicle 150 by a brake stepping operation on display section 108. Here, the threshold value to be compared with the remaining distance to power supply section 143 is set to, for example, 1 meter. Furthermore, the specific control method in vehicle-side control section 107 will be described later.

Display section 108 serves as an indication section that indicates a predetermined guidance. Specifically, display section 108 displays guidance for correcting the approach route, guidance for indicating a state where the approach route is correct, or guidance for stopping vehicle 150 by stepping on the brake in accordance with the control of vehicle-side control section 107.

<Configuration of Power Supply Apparatus>

Power-supply-side communication section 141 receives a power supply start signal or a power supply stop signal transmitted from vehicle-side communication section 102. Power-supply-side communication section 141 outputs the received power supply start signal or the received power supply stop signal to power-supply-side control section 142. Power-supply-side communication section 141 indicates the reference value of the power transmitted from power supply section 143 to power receiving section 101 when power is supplied from power supply apparatus 140 to power receiving section 101.

When the power supply start signal is input from power-supply-side communication section 141, power-supply-side control section 142 performs a control so that the power supply from power supply section 143 starts. When the power supply stop signal is input from power-supply-side communication section 141, power-supply-side control section 142 performs a control so that the power supply from power supply section 143 stops.

Power supply section 143 supplies power to power receiving section 101 facing thereto in accordance with the control of power-supply-side control section 142.

<Operation of Vehicle Guidance Apparatus>

Figure 2:
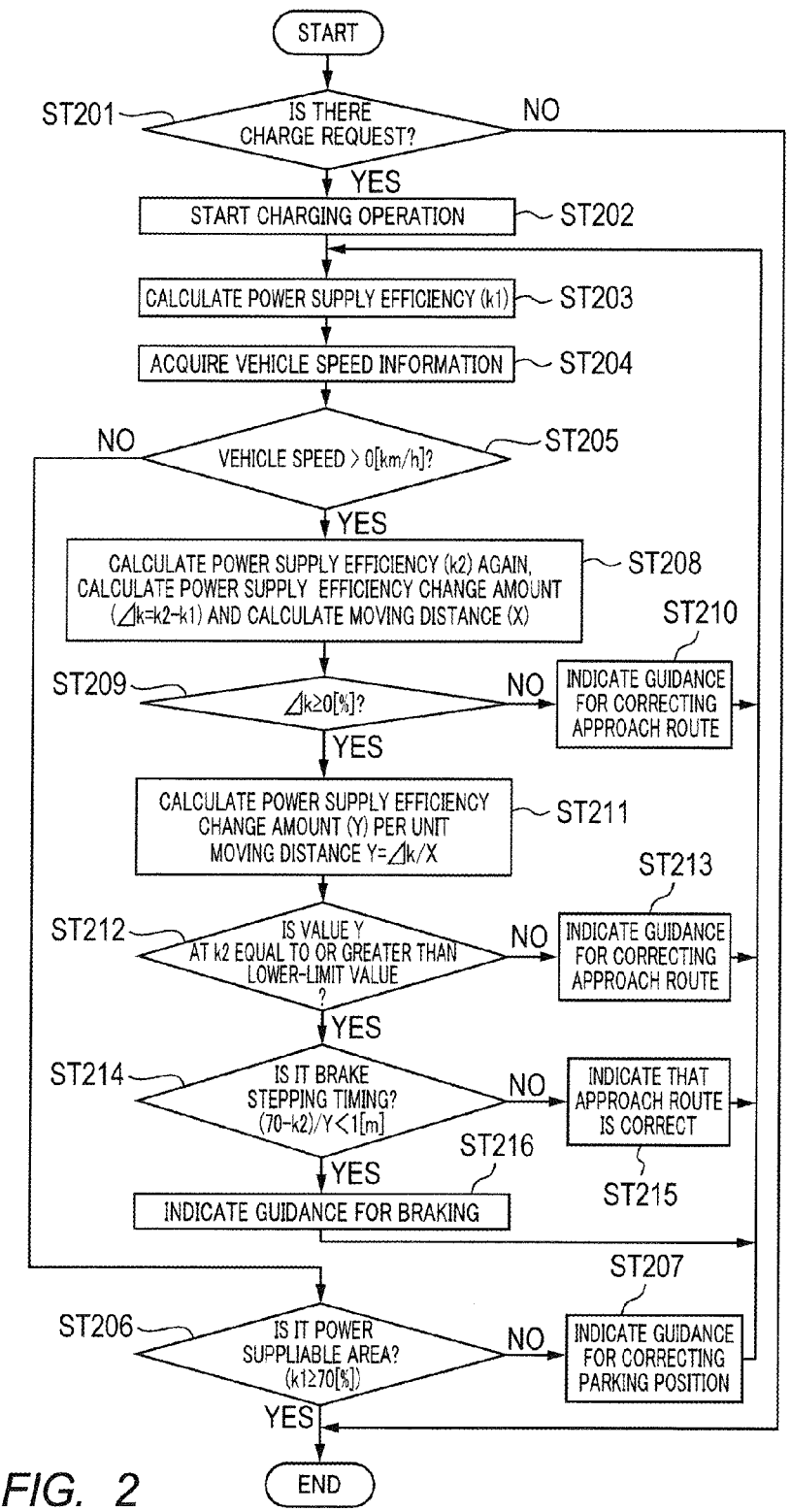
FIG. 2 is a flowchart illustrating an operation of a vehicle guidance apparatus according to the embodiment of the present invention.

FIG. 2 is a flowchart illustrating an operation of vehicle guidance apparatus 100. FIG. 2 illustrates a case where the reference value of the power transmitted from power supply section 143 to power receiving section 101 is set to 70%.

First, vehicle-side control section 107 determines whether there is a charge request from the outside (step ST201).

When there is no charge request (step ST201: NO), vehicle guidance apparatus 100 ends the process.

Meanwhile, when there is a charge request (step ST201: YES), vehicle-side control section 107 starts the charging operation by controlling power receiving section 101 (step ST202).

Next, power supply efficiency calculation section 103 calculates the power supply efficiency (k1) (step ST203).

Next, vehicle information acquisition section 104 acquires the vehicle speed information as the vehicle information (step ST204).

Next, vehicle-side control section 107 determines whether the vehicle speed is greater than 0 km/h (step ST205).

When the vehicle speed is equal to or less than 0 km/h (step ST205: NO), vehicle-side control section 107 determines whether vehicle 150 exists in a power suppliable area (step ST206). That is, vehicle-side control section 107 determines whether the power supply efficiency at that time is equal to or greater than 70%.

When vehicle 150 exists in the power suppliable area (step ST206: YES), vehicle guidance apparatus 100 ends the process.

Meanwhile, when vehicle 150 does not exist in the power suppliable area (step ST206: NO), vehicle-side control section 107 controls display section 108 so that a parking position correction guidance is performed (step ST207), and then returns the process to step ST203.

Further, in step ST205, when the vehicle speed information is greater than 0 km/h (step ST205: YES), power supply efficiency calculation section 103 measures the power supply efficiency (k2) again. Further, change amount calculation section 105 acquires power supply efficiency change amount Δk by calculation (Δk=k2−k1), and acquires moving distance X of vehicle 150 when power supply efficiency change amount Δk is acquired (step ST208). That is, change amount calculation section 105 acquires moving distance X of vehicle 150 until power supply efficiency k2 is calculated in step ST207 after power supply efficiency k1 is calculated in step ST203. Specifically, change amount calculation section 105 acquires moving distance X by multiplying time t until power supply efficiency k2 is calculated after the calculation of power supply efficiency k1 by average value A of the vehicle speed of the vehicle speed information in time t (X=A*t).

Next, change amount calculation section 105 determines whether power supply efficiency change amount Δk is equal to or greater than 0 (step ST209).

When power supply efficiency change amount Δk is less than 0 (does not increase) (step ST209: NO), vehicle-side control section 107 controls display section 108 so as to display guidance for correcting the approach route of vehicle 150 approaching power supply section 143 (step ST210).

Meanwhile, when power supply efficiency change amount Δk is equal to or greater than 0 (increases) (step ST209: YES), change amount calculation section 105 acquires power supply efficiency change amount Y per unit moving distance (Y=Δk/X) (step ST211).

Next, vehicle-side control section 107 determines whether power supply efficiency change amount Y per unit moving distance is equal to or greater than the lower-limit value of the power supply efficiency at that time by referring to the table stored in storage section 106 (step ST212).

When power supply efficiency change amount Y per unit moving distance is less than the lower-limit value (step ST212: NO), vehicle 150 approaching power supply section 143 is shifted from the approach route, and hence vehicle-side control section 107 controls display section 108 so as to display guidance for correcting the approach route (step ST213).

Meanwhile, when power supply efficiency change amount Y per unit moving distance is equal to or greater than the lower-limit value (step ST212: YES), vehicle-side control section 107 determines whether it is the brake stepping timing ((70−k2)/Y<1[m]?) (step ST214).

When it is not the brake stepping timing (step ST214: NO), vehicle-side control section 107 controls display section 108 so as to display a message that the approach route is correct (step ST215), and vehicle guidance apparatus 100 returns the process to step ST203.

Meanwhile, when it is the brake stepping timing (step ST214: YES), vehicle-side control section 107 controls display section 108 so as to display guidance for stopping vehicle 150 by stepping on the brake (step ST216), and vehicle guidance apparatus 100 returns the process to step ST203.

<Power Supply Efficiency at Power Supply Section>

Figure 3:
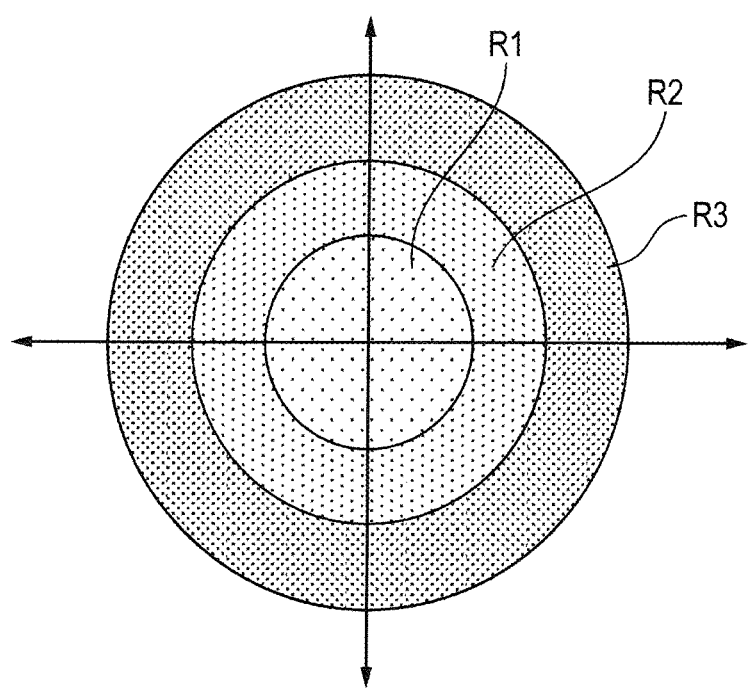
FIG. 3 is a diagram illustrating a power supply efficiency of a power supply section of the embodiment of the present invention.

FIG. 3 is a diagram illustrating the power supply efficiency at power supply section 143.

In FIG. 3, power supply section 143 has a circular shape in the top view, and power supply efficiencies R1, R2, and R3 (R1>R2>R3) which are concentrically provided from the center of the circular circle decrease as it comes closer to the outer periphery of the circular circle. For example, R1 is 80%, R2 is 75%, and R3 is 70%.

<Specific Control Example of Vehicle-Side Control Section>

Figure 4:
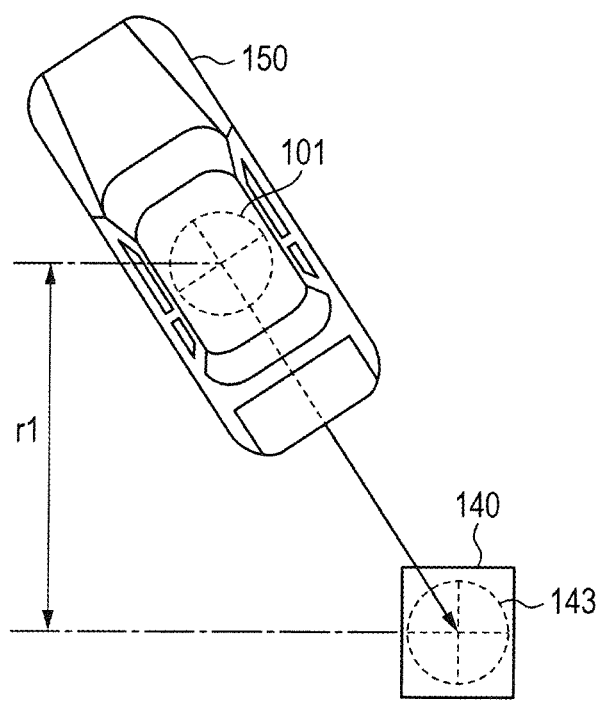
FIG. 4 is a diagram illustrating approach route 1 with respect to the power supply section of the vehicle of the embodiment of the present invention.
Figure 5:
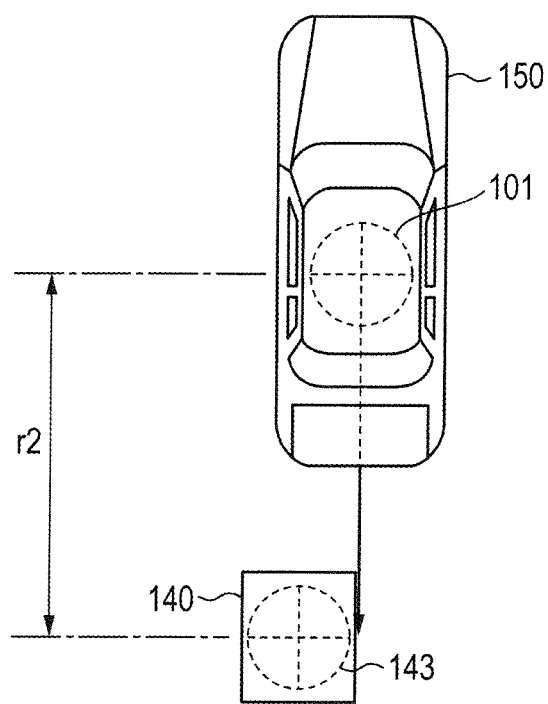
FIG. 5 is a diagram illustrating approach route 2 with respect to the power supply section of the vehicle of the embodiment of the present invention.
Figure 6:
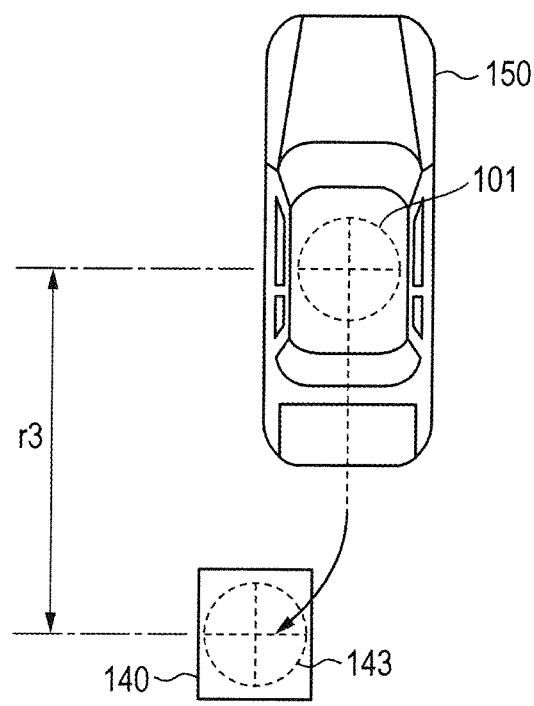
FIG. 6 is a diagram illustrating approach route 3 with respect to the power supply section of the vehicle of the embodiment of the present invention.
Figure 7:
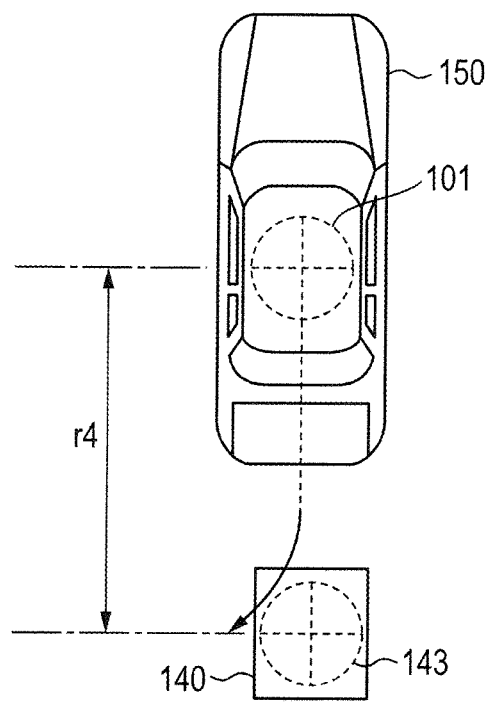
FIG. 7 is a diagram illustrating approach route 4 with respect to the power supply section of the vehicle of the embodiment of the present invention.
Figure 8:
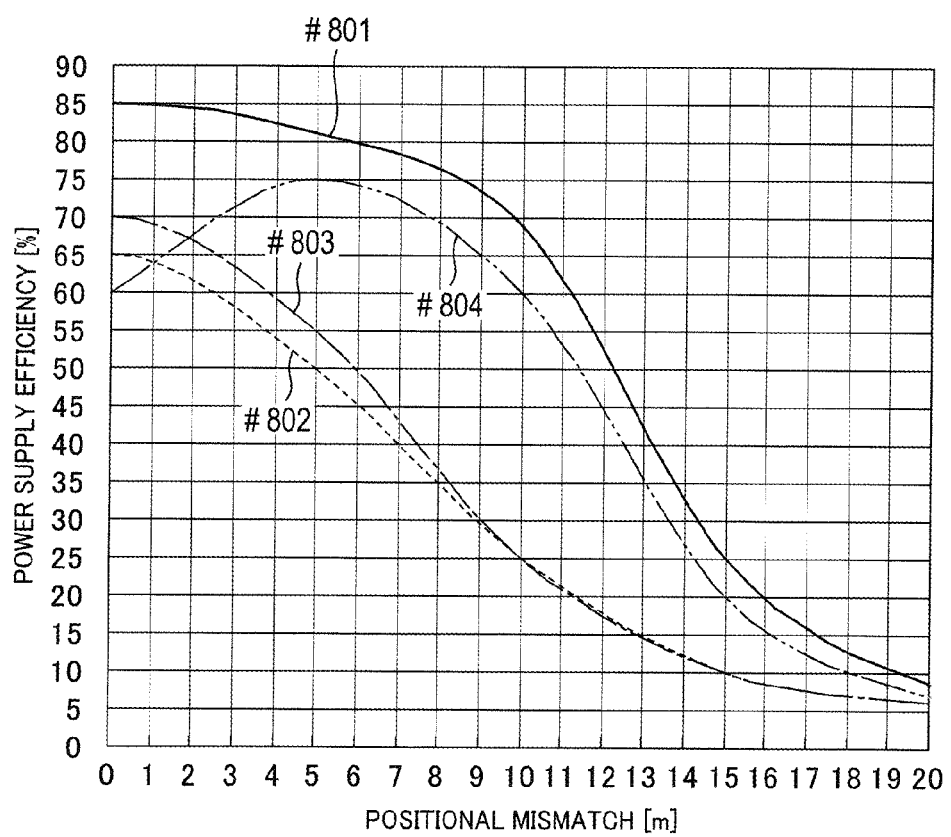
FIG. 8 is a diagram illustrating a relationship between a positional mismatch between a power supply section and a power receiving section, and a power supply efficiency at each approach route of FIG. 7.

FIG. 4 is a diagram illustrating approach route 1 with respect to the power supply section of vehicle 150. FIG. 5 is a diagram illustrating approach route 2 with respect to the power supply section of vehicle 150. FIG. 6 is a diagram illustrating approach route 3 with respect to the power supply section of vehicle 150. FIG. 7 is a diagram illustrating approach route 4 with respect to the power supply section of vehicle 150. FIG. 8 is a diagram illustrating a relationship between the positional mismatch between power supply section 143 and power receiving section 101, and the power supply efficiency in each approach route of FIG. 7. FIG. 9 is a diagram illustrating the power supply efficiency change amount per unit moving distance of each of the power supply efficiencies at each approach route obtained from FIG. 8.

In FIG. 8, the positional deviation [m] of the horizontal axis indicates the distance between the center of power receiving section 101 and the center of power supply section 143 in the front to rear direction. Specifically, in the case of approach route 1 of FIG. 4, the positional mismatch of FIG. 8 is distance r1 of FIG. 4. In the case of approach route 2 of FIG. 5, the positional mismatch of FIG. 8 is distance r2 of FIG. 5. In the case of approach route 3 of FIG. 6, the positional deviation of FIG. 8 is distance r3 of FIG. 6. In the case of approach route 4 of FIG. 7, the positional mismatch of FIG. 8 is distance r4 of FIG. 7.

FIGS. 4 and 6 illustrate a case where vehicle 150 succeeds in approaching with respect to power supply section 143. That is, FIGS. 4 and 6 illustrate a case where power receiving section 101 and power supply section 143 face each other in the state illustrated in FIG. 1. FIG. 5 illustrates a case where vehicle 150 fails in approaching with respect to power supply section 143. FIG. 7 illustrates a case where vehicle 150 finally fails in approaching with respect to power supply section 143 since vehicle 150 changes the advancing direction while approaching power supply section 143.

In FIG. 8, in the case of approach route 1, since the vehicle accurately follows the correct approach route as indicated by curve #801, the power supply efficiency of the power receiving section exceeds 70% even when the positions of power supply section 143 and power receiving section 101 do not accurately match each other. In the case of approach route 2, since the vehicle always follows a route shifted from the correct approach route as indicated by curve #802, power may not be supplied to the vehicle, and the power supply efficiency does not exceed 70%. In the case of approach route 3, since the vehicle substantially follows the correct approach route as indicated by curve #803, the power supply efficiency finally becomes 70%. In the case of approach route 4, since the vehicle is largely shifted from the correct approach route in the course of the route as indicated by curve #804, the power supply efficiency is finally less than 70%. Furthermore, the reason why the value of approach route 3 of FIG. 8 has a peak value at the power supply efficiency of 40% is that the gradient in the vicinity of the power supply efficiency of 40% at curve #803 of approach route 3 illustrated in FIG. 8 is the steepest.

From the description above, approach route 3 of FIG. 6 illustrates the limit of the success in which vehicle 150 approaches power supply section 143. Accordingly, each value (the first reference value) of the power supply efficiency change amount per unit moving distance for each of the power supply efficiencies in approach route 3 of FIG. 9 becomes the lower-limit value of each of the power supply efficiencies written in the table stored in storage section 106.

For example, the lower-limit value of the power supply efficiency of 30% is 7 [%/m] from FIG. 9. Since the power supply efficiency change amount per unit moving distance of the power supply efficiency of 30% of each of approach routes 1 and 4 is 8 [%/m] and is equal to or greater than the lower-limit value, vehicle-side control section 107 controls display section 108 so as to display a message that the approach route is correct.

Meanwhile, since the power supply efficiency change amount per unit moving distance of the power supply efficiency of 30% of approach route 2 is 6.5 [%/m] and is less than the lower-limit value, vehicle-side control section 107 controls display section 108 so as to display guidance for correcting the approach route. Further, the lower-limit value of the power supply efficiency of 70% is 0 [%/m]. Since the power supply efficiency change amount per unit moving distance of the power supply efficiency of 70% of approach route 4 is −3.5 [%/m] and is less than the lower-limit value, vehicle-side control section 107 controls display section 108 so as to display guidance for correcting the approach route.

Furthermore, the value of "−3.5" acquired when the power supply efficiency of approach route 4 is greater than 70% and the power supply efficiency is 70% means that vehicle 150 passes by power supply section 143 and is distant from power supply section 143.

Effect of Embodiment

According to the embodiment, since the positional relation between the power receiving section and the power supply section may be specified without using the image data, the vehicle that approaches the power supply section from a place distant from the power supply section can be easily guided to the power supply section.

Further, according to the embodiment, since there is no need to install a guiding camera, the manufacturing cost of the system can be reduced.

Further, according to the embodiment, since an instruction of stopping the vehicle by stepping on the brake is displayed, it is possible to accurately match the positions of the power receiving section and the power supply section.

Further, according to the embodiment, since the vehicle is guided by using the power supply efficiency, it is possible to determine whether the power supply efficiency is sufficient for the charging operation while guiding the vehicle. Accordingly, even when a slight positional mismatch occurs in the position matching between the power receiving section and the power supply section, the vehicle may be charged while the vehicle is stopped at a position where a sufficient power supply efficiency can be obtained. Thus, it is possible to reduce the burden on the driver of the vehicle due to the precise position matching between the power receiving section and the power supply section.

Variations of Embodiment

In the embodiment, moving distance X of vehicle 150 is acquired from the vehicle speed information, but the invention is not limited thereto. For example, moving distance X of vehicle 150 may be directly acquired.

Further, in the embodiment, the reference value of the power transmitted from power supply section 143 to power receiving section 101 is received from power supply apparatus 140, but the invention is not limited to this case. For example, the reference value may be stored in advance in vehicle 150 and the reference value may be arbitrarily set by a user.

Further, in the embodiment, the guidance of vehicle 150 approaching power supply section 143 is performed on a display, but the invention is not limited to this case. For example, the guidance of vehicle 150 approaching power supply section 143 may be performed by any method using a sound or the like.

Further, in the embodiment, an instruction of stopping vehicle 150 by stepping on the brake is displayed, but the invention is not limited thereto. For example, an instruction of stopping vehicle 150 by stepping on the brake may not be displayed. In this case, the driver of vehicle 150 stops vehicle 150 by appropriately stepping on the brake while viewing the guidance of the power supply efficiency or the approach route.

Further, in the embodiment, the guidance is performed when vehicle 150 moves backward and approaches the power supply section, but the invention is not limited thereto. For example, the guidance may be performed when vehicle 150 moves forward and approaches the power supply section.

Further, in the embodiment, the guidance for correcting the approach route or indicating the correct approach route is displayed on display section 108, but the invention is not limited thereto. For example, the guidance may be performed by a method using a sound or the like other than a display.

The disclosure of Japanese Patent Application No. 2011-266924, filed on Dec. 6, 2011, including the specification, drawings and abstract, is incorporated herein by reference in its entirety.

INDUSTRIAL APPLICABILITY

The vehicle guidance apparatus and the vehicle guidance method according to the present invention are suitable for use as an apparatus is mounted on a vehicle which receives power from a power supply section in a non-contact state and that guides the vehicle to the power supply section, and as a method for the apparatus.

REFERENCE SIGNS LIST

10 Charging system
100 Vehicle guidance apparatus
101 Power receiving section
102 Vehicle-side communication section
103 Power supply efficiency calculation section
104 Vehicle information acquisition section
105 Change amount calculation section
106 Storage section
107 Vehicle-side control section
108 Display section
109 Storage battery
140 Power supply apparatus
141 Power-supply-side communication section
142 Power-supply-side control section
143 Power supply section
150 Vehicle

The invention claimed is:

1. A vehicle guidance apparatus configured to be mounted on a vehicle that receives power from a power supply section in a non-contact state and to guide the vehicle to the power supply section, the vehicle guidance apparatus comprising:
a power receiving section that receives power from the power supply section;
a power supply efficiency calculation section that calculates a power supply efficiency that indicates how efficiently the power receiving section receives the power from the power supply section;

a change amount calculation section that calculates a power supply efficiency change amount that is a change amount of the power supply efficiency calculated by the power supply efficiency calculation section;

a control section that causes an indication section to make indication for guiding the vehicle to the power supply section based on the power supply efficiency change amount calculated by the change amount calculation section; and a storage section that stores a first reference value of the power supply efficiency change amount per unit moving distance of the vehicle for each of the power supply efficiencies, wherein:

the power supply efficiency change amount calculated by the change amount calculation section is the power supply efficiency change amount per unit moving distance that is a distance the vehicle moves until the next power supply efficiency is calculated after the power supply efficiency is calculated by the power supply efficiency calculation section; and the control section causes the indication section to make indication for guiding the vehicle to the power supply section, based on a magnitude relationship between the power supply efficiency change amount per unit moving distance calculated by the change amount calculation section and the first reference value corresponding to the power supply efficiency calculated by the power supply efficiency calculation section.

2. The vehicle guidance apparatus according to claim 1, wherein the control section causes the indication section to indicate that an approach route is correct, when the power supply efficiency change amount per unit moving distance calculated by the change amount calculation section is constant or increases while the power supply efficiency change amount per unit moving distance calculated by the change amount calculation section is equal to or greater than the first reference value corresponding to the power supply efficiency calculated by the power supply efficiency calculation section.

3. The vehicle guidance apparatus according to claim 1, wherein the control section causes the indication section to indicate guidance for correcting an approach route, when the power supply efficiency change amount per unit moving distance calculated by the change amount calculation section decreases or the power supply efficiency change amount per unit moving distance calculated by the change amount calculation section is less than the first reference value corresponding to the power supply efficiency calculated by the power supply efficiency calculation section.

4. The vehicle guidance apparatus according to claim 1, wherein the control section acquires a remaining distance to the power supply section by dividing a subtraction value by the power supply efficiency change amount per unit moving distance and causes the indication section to indicate guidance for stopping the vehicle, when the remaining distance to the power supply section is less than a predetermined threshold value, the subtraction value being obtained by subtracting the power supply efficiency calculated by the power supply efficiency calculation section from a second reference value that is a lower-limit value of the power supply efficiency necessary for charging a storage battery included in the vehicle.

5. A vehicle guidance method for a vehicle guidance apparatus configured to be mounted on a vehicle that receives power from a power supply section in a non-contact state and to guide the vehicle to the power supply section, the vehicle guidance method comprising:

calculating a power supply efficiency that indicates how efficiently a power receiving section configured to receive power from the power supply section receives the power from the power supply section;

calculating a power supply efficiency change amount that is a change amount of the power supply efficiency calculated in the calculating of the power supply efficiency;

controlling indication for guiding the vehicle to the power supply section based on the power supply efficiency change amount calculated in the calculating of the power supply efficiency change amount; and storing a first reference value of the power supply efficiency change amount per unit moving distance of the vehicle for each of the power supply efficiencies, wherein:

the power supply efficiency change amount calculated in the calculating of the power supply efficiency change amount is the power supply efficiency change amount per unit moving distance that is a distance the vehicle moves until the next power supply efficiency is calculated after the power supply efficiency is calculated in the calculating of the power supply efficiency; and in the controlling of indication, an indication section is caused to make indication for guiding the vehicle to the power supply section, based on a magnitude relationship between the power supply efficiency change amount per unit moving distance calculated in the calculating of the change amount and the first reference value corresponding to the power supply efficiency calculated in the calculating of the power supply efficiency.

* * * * *